(12) United States Patent
Franklin

(10) Patent No.: US 8,723,353 B1
(45) Date of Patent: May 13, 2014

(54) WAVE ENERGY CONVERTER DESIGN INCORPORATING AN INDUCTION GENERATOR

(71) Applicant: Barrie Franklin, Nova Scotia (CA)

(72) Inventor: Barrie Franklin, Nova Scotia (CA)

( * ) Notice: Subject to any disclaimer, the term of this patent is extended or adjusted under 35 U.S.C. 154(b) by 0 days.

(21) Appl. No.: 13/683,677

(22) Filed: Nov. 21, 2012

(51) Int. Cl.
- F03B 13/10 (2006.01)
- F03B 13/12 (2006.01)
- H02P 9/04 (2006.01)

(52) U.S. Cl.
USPC .............. 290/53; 290/42

(58) Field of Classification Search
USPC ................. 290/42, 53
See application file for complete search history.

(56) References Cited

U.S. PATENT DOCUMENTS

| | | | |
|---|---|---|---|
| 3,696,251 A | 10/1972 | Last et al. | 290/53 |
| 4,539,485 A | 9/1985 | Neuenschwander | 290/53 |
| 4,622,473 A * | 11/1986 | Curry | 290/53 |
| 5,136,173 A | 8/1992 | Rynne | 290/53 |
| 6,020,653 A * | 2/2000 | Woodbridge et al. | 290/53 |
| 6,140,712 A | 10/2000 | Fredriksson et al. | 290/53 |
| 6,256,985 B1 | 7/2001 | Gardner et al. | 60/398 |
| 6,291,904 B1 * | 9/2001 | Carroll | 290/53 |
| 6,392,314 B1 * | 5/2002 | Dick | 290/53 |
| 6,457,307 B1 | 10/2002 | Feldman et al. | 60/398 |
| 6,644,027 B1 * | 11/2003 | Kelly | 60/498 |
| 6,731,018 B1 * | 5/2004 | Grinsted et al. | 290/42 |
| 6,731,019 B2 | 5/2004 | Burns et al. | 290/42 |
| 6,768,216 B1 | 7/2004 | Carroll et al. | 290/42 |
| 6,772,592 B2 * | 8/2004 | Gerber et al. | 60/495 |
| 6,791,205 B2 * | 9/2004 | Woodbridge | 290/53 |
| 6,849,963 B2 * | 2/2005 | Grinsted et al. | 290/42 |
| 6,864,592 B1 * | 3/2005 | Kelly | 290/42 |
| 7,141,888 B2 | 11/2006 | Sabol et al. | 290/53 |

(Continued)

FOREIGN PATENT DOCUMENTS

| | | |
|---|---|---|
| DE | 4338103 A1 | 11/1995 |
| EP | 1691072 A1 | 8/2006 |

(Continued)

OTHER PUBLICATIONS

Hamilton, Luc; "AWS MK II: Deployment, Monitoring and Evaluation of a Prototype Advanced Wave Energy Device", AWS Ocean Energy Ltd., Oct. 25, 2006.

(Continued)

Primary Examiner — Pedro J Cuevas
(74) Attorney, Agent, or Firm — Kolisch Hartwell, P.C.

(57) ABSTRACT

Wave energy converters incorporating the components of an induction generator that are integrated with the components of a pneumatic spring are provided. The wave energy converters have a buoy having an interior guide, motion of the buoy representing a first degree of freedom and a spar mounted within the interior guide so as to be movable therein, motion of the spar representing a second degree of freedom. There is a pneumatic spring between the spar and the buoy to provide restoring forces when the spar departs from a quiescent position relative to the buoy. There is damping element in the form of an induction generator having an armature and a stator, with one of the stator and armature fixed to the spar and the other of the stator and armature fixed to the buoy to generate power when the spar moves relative to the buoy in the presence of excitation by ocean gravity waves. The mass of the wave energy converter and dimensions of the buoy are such that in use, the buoy floats in a partially submerged position.

24 Claims, 13 Drawing Sheets

(56) References Cited

U.S. PATENT DOCUMENTS

| | | | | |
|---|---|---|---|---|
| 7,164,212 | B2 * | 1/2007 | Leijon et al. | 290/42 |
| 7,168,532 | B2 * | 1/2007 | Stewart et al. | 188/161 |
| 7,199,481 | B2 * | 4/2007 | Hirsch | 290/42 |
| 7,242,106 | B2 * | 7/2007 | Kelly | 290/42 |
| 7,298,054 | B2 * | 11/2007 | Hirsch | 290/42 |
| 7,304,399 | B2 * | 12/2007 | Leijon et al. | 290/42 |
| 7,305,823 | B2 | 12/2007 | Stewart et al. | 60/495 |
| 7,323,790 | B2 | 1/2008 | Taylor et al. | 290/42 |
| 7,355,293 | B2 * | 4/2008 | Bernhoff et al. | 290/42 |
| 7,362,003 | B2 * | 4/2008 | Stewart et al. | 290/42 |
| 7,385,301 | B2 * | 6/2008 | Hirsch | 290/42 |
| 7,405,489 | B2 * | 7/2008 | Leijon et al. | 290/42 |
| 7,420,287 | B2 * | 9/2008 | Smushkovich | 290/42 |
| 7,443,046 | B2 | 10/2008 | Stewart et al. | 290/53 |
| 7,498,685 | B2 | 3/2009 | Turner | 290/53 |
| 7,759,814 | B2 | 7/2010 | Oigarden | 290/53 |
| 7,896,576 | B2 * | 3/2011 | Jean et al. | 405/76 |
| 7,909,536 | B2 | 3/2011 | Dick | 405/76 |
| 8,013,462 | B2 | 9/2011 | Protter et al. | 290/53 |
| 8,067,849 | B2 | 11/2011 | Stewart et al. | 290/53 |
| 8,264,093 | B2 * | 9/2012 | Moore | 290/42 |
| 8,480,381 | B2 * | 7/2013 | Burns | 417/331 |
| 2004/0201223 | A1 * | 10/2004 | Grinsted et al. | 290/54 |
| 2004/0251692 | A1 * | 12/2004 | Leijon et al. | 290/42 |
| 2005/0099010 | A1 * | 5/2005 | Hirsch | 290/42 |
| 2005/0218728 | A1 * | 10/2005 | Stewart et al. | 310/12 |
| 2005/0235641 | A1 * | 10/2005 | Sabol et al. | 60/497 |
| 2005/0237775 | A1 * | 10/2005 | Sabol et al. | 363/178 |
| 2006/0208839 | A1 * | 9/2006 | Taylor et al. | 335/205 |
| 2007/0040384 | A1 * | 2/2007 | Bernhoff et al. | 290/42 |
| 2007/0080539 | A1 * | 4/2007 | Kelly | 290/42 |
| 2007/0090652 | A1 * | 4/2007 | Leijon et al. | 290/53 |
| 2007/0126239 | A1 * | 6/2007 | Stewart et al. | 290/53 |
| 2007/0132246 | A1 * | 6/2007 | Hirsch | 290/42 |
| 2007/0228737 | A1 * | 10/2007 | Hirsch | 290/42 |
| 2007/0278800 | A1 | 12/2007 | Galich | 290/1 R |
| 2008/0088134 | A1 * | 4/2008 | Montgomery | 290/53 |
| 2008/0238103 | A1 * | 10/2008 | Montgomery | 290/53 |
| 2009/0309366 | A1 | 12/2009 | Moore | 290/53 |
| 2010/0016728 | A1 * | 1/2010 | Dietz et al. | 600/459 |
| 2010/0117366 | A1 * | 5/2010 | Rhinefrank et al. | 290/53 |
| 2013/0127168 | A1 * | 5/2013 | Dragic | 290/53 |

FOREIGN PATENT DOCUMENTS

| | | |
|---|---|---|
| GB | 1271490 | 4/1972 |
| GB | 1513308 | 6/1978 |
| JP | 2012-207652 A | 10/2012 |
| WO | WO2008/109062 A1 | 9/2008 |

OTHER PUBLICATIONS

G.S. Payne, J.R.M. Taylor, P. Parkin, and Stephen H. Salter, "Numerical Modeling of the Sloped IPS Buoy WEC", Proceedings of the 16th (2006 International Offshore and Polar Engineering Conference, San Francisco, California, USA, May 28-Jun. 2, 2006.

Patrick Hartigan, "The Wavebob Device", Wavebob Ltd.; see also http://www.fp7-standpoint.eu/index.php/en/wave-energy/wavebob-device (Dec. 23, 2011).

"PB150 Powerbuoy", Ocean Power Technologies, Inc.; see also http://www.oceanpowertechnologies.com/pb150.html (Dec. 23, 2011).

A. Wacker and K. Neilsen, "Mathematical and Numerical Modeling of the AquaBuOY Wave Energy Converter", Mathematics-in-Industry Case Studies Journal, vol. 2. pp. 16-33 (2010).

Donna Daly, Authorized Officer, Canadian Intellectual Property Office, "International Search Report" in connection with related App. Serial No. PCT/CA2013/050742, dated Jan. 6, 2014, 2 pages.

Donna Daly, Authorized Officer, Canadian Intellectual Property Office, "Written Opinion of the International Searching Authority" in connection with related App. Serial No. PCT/CA2013/050742, dated Jan. 6, 2014, 5 pages.

* cited by examiner

WAVE ENERGY CONVERTER DESIGN INCORPORATING AN INDUCTION GENERATOR

FIELD

The application relates to wave energy converters.

BACKGROUND

Ocean waves in moderate to high sea states present high power densities and consequently represent an attractive energy source for power generation using renewable resources. Much work on wave energy converters (WEC's) has been done and many proposals for exploiting ocean-wave power have been documented.

An early approach to wave energy extraction was based on a single-degree-of-freedom system, for which an oscillating body was directly coupled to a power take-off mechanism that was suspended on the bottom. Heave-excited WEC's with a single degree of freedom generate relatively low velocity motions that are not high enough to use practical direct-drive electrical generators unless mechanical transformers are engaged. Moreover, it may be difficult to provide suitable connection hardware from the buoy to the reference platform on the sea bottom due to tidal action and the very high forces involved. Systems with two degrees of freedom overcome bottom connection problems, a necessity in deep water.

SUMMARY

According to a broad aspect, the invention provides a wave energy converter with two degrees of freedom. The wave energy converter has a buoy having an interior guide, motion of the buoy representing a first degree of freedom; a spar mounted within the interior guide so as to be movable therein, motion of the spar representing a second degree of freedom; a pneumatic spring between the spar and the buoy to provide restoring forces when the spar departs from a quiescent position relative to the buoy; and a damping element in the form of an induction generator having an armature and a stator, with one of the stator and armature fixed to the spar and the other of the stator and armature fixed to the buoy to generate power when the spar moves relative to the buoy in the presence of excitation by ocean gravity waves. The mass of the wave energy converter and dimensions of the buoy are such that in use, the buoy floats in a partially submerged position.

DETAILED DESCRIPTION

Figure 1:
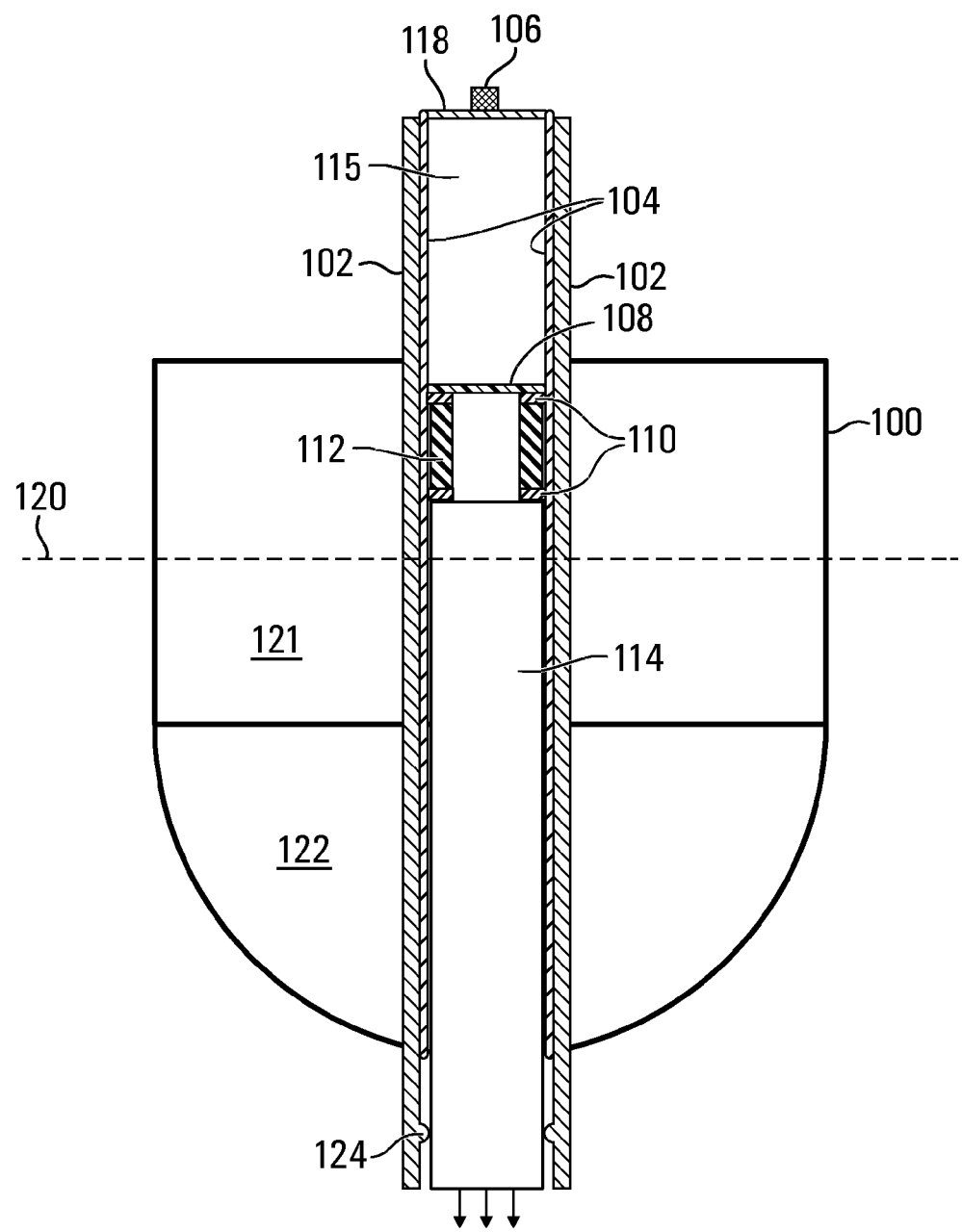
FIG. 1 is a side cutaway view of a wave energy converter provided by an embodiment of the invention featuring an asymmetric pneumatic spring.

Embodiments of the invention provide a heave-excited WEC with two degrees of freedom. In some embodiments, the WEC is designed to have a transfer function that exhibits a bandwidth that matches or is included within the bandwidth of the average annual wave height spectrum of interest as derived from long-term wave statistics. The power take-off (PTO) is provided by an induction generator. In some embodiments, the WEC is designed to have a transfer function that also provides working velocities that are sufficiently high for the satisfactory operation of a direct drive linear electrical generator. In order to achieve this, the secondary system of the WEC includes a spring in addition to the PTO resistance and mass.

WEC's are provided by embodiments of the invention in which a streamlined neutrally buoyant spar is used for the secondary mass. An induction generator, for example a linear induction generator serves as the PTO. Robustness and simplicity are very important for heave-excited wave energy converters. A direct-drive generator provides these characteristics. A linear induction generator with a distributed armature is therefore a very attractive direct-drive PTO for this application. A vector controller may be provided to control force and flux density independently during fast-response bi-directional high-power operation.

A wave energy converter provided by an embodiment of the invention will be described with reference to FIG. 1, which provides a side cutaway view. A buoy structure is generally indicated at 100 to which is fixed an armature (elements 102,104 described below) of a tubular induction generator. The buoy 100 in the illustrated example generally consists of a hemispherical body 122 on which a partially submerged cylinder 121 may be mounted to increase the mass of the unit for a given buoy radius albeit at a potential penalty in output power. The armature consists of a thin-walled steel cylinder 102 inside which an aluminum thin-walled cylinder 104 having a cap 118 is flush fitted. The aluminum thin-walled cylinder 104 of the armature serves as a guide for a generally cylindrical spar 114. The generator stator (windings) 112 is mounted on the top of the spar 114 and fitted with bearing assemblies 110 equispaced around the stator circumference at the top and bottom of the stator 112. A piston seal is mounted on the top part of the stator 112. Also shown are roller guides 124 to assist in maintaining the position of the spar 114. The stator bearings maintain the specified separation between the stator 112 and the armature 102,104 in the presence of a magnetic attraction force between the armature and the stator when departures from the perfect geometry for zero force, which is inherent in the tubular generator configuration, occur. Such departures are introduced by manufacturing tolerance issues. The space between the top of the piston assembly and the cap 118 of the aluminum thin-walled cylinder 104 of the armature functions as a chamber 115 of a pneumatic spring. A valve 106 is provided in the cap 118 of the aluminum thin-walled cylinder 104 of the armature to adjust the mass of air in the chamber. When placed in water, the wave energy converter floats, with the designed sea level indicated at 120.

In this embodiment, the spar 114 serves as the secondary mass, the piston for the pneumatic spring and the platform for the generator stator 112. The spar is extended to the required depth in the direction of the arrows shown in FIG. 1. The aluminum thin-walled cylinder 104 has a smooth inner surface that also serves as the cylinder for the pneumatic spring. In the example of FIG. 1, the armature is a distributed armature, but alternatively a ladder construction may be employed as detailed below. Pneumatic spring operation is realized more easily using a distributed armature because the ladder construction requires tight tolerances and careful assembly to achieve a sufficiently smooth surface for the piston seal to properly function.

Any of the embodiments described herein may include a vector controller. A vector controller can be used to provide independent control of the force and the flux. In the subject application, first, energy provided by the generator in normal operation is extracted via a linear damping characteristic (force proportional to velocity). The vector controller therefore requires an accurate measurement of the relative speed between the armature and the stator. Second, the vector controller can impose a field reduction at low speeds to improve efficiency. Third, higher forces may be engaged by the vector controller to control relative displacement during extreme events associated with the random excitation.

Figure 2A:
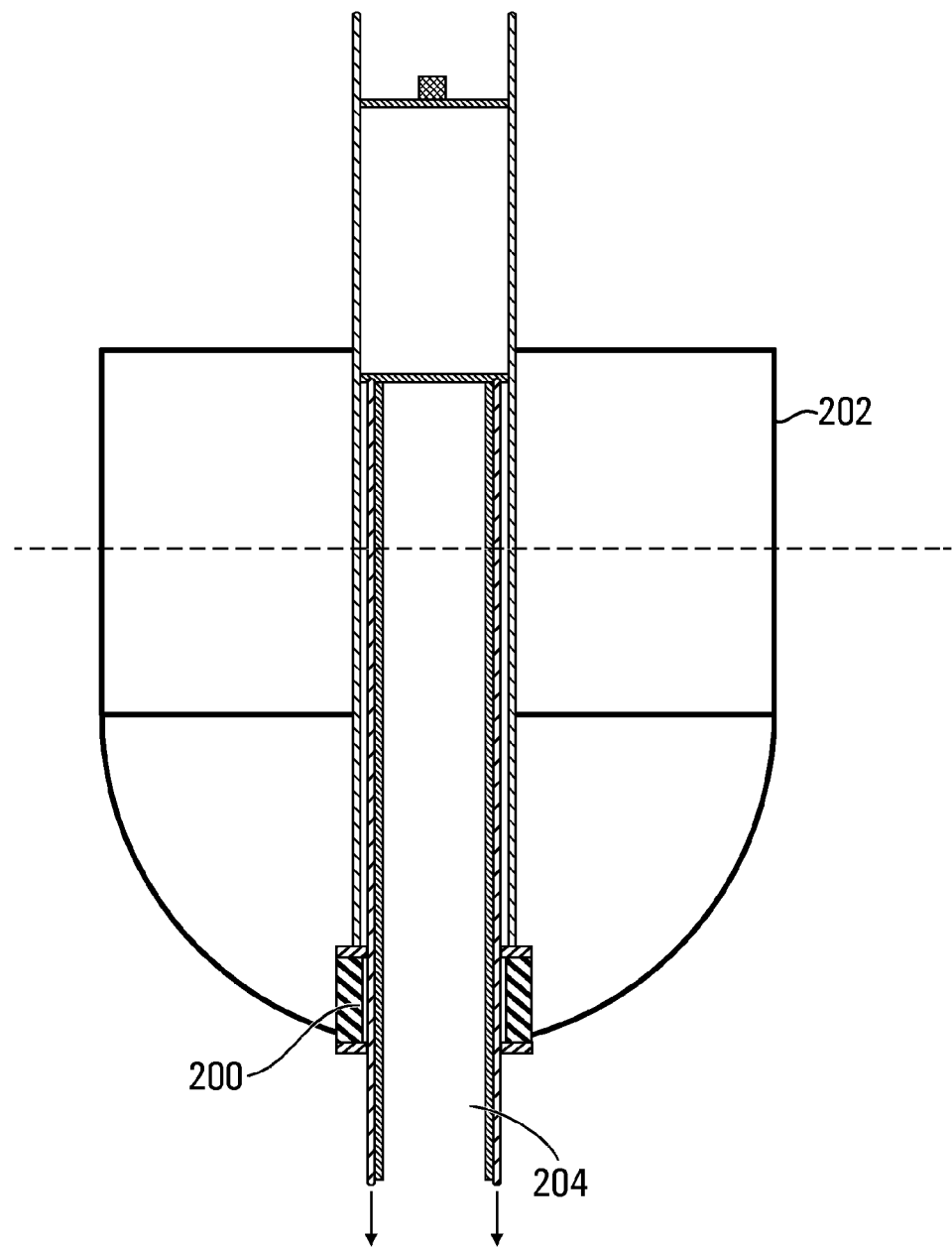
FIG. 2A is a cross sectional view of another wave energy converter provided by an embodiment of the invention featuring an asymmetric pneumatic spring.

Referring now to FIG. 2A, depicted is another wave energy converter provided by an embodiment of the invention. This embodiment differs from the embodiment of FIG. 1 in that a stator 200 is mounted at the bottom of the buoy 202, and the spar 204 becomes the armature in this case.

Figure 2B:
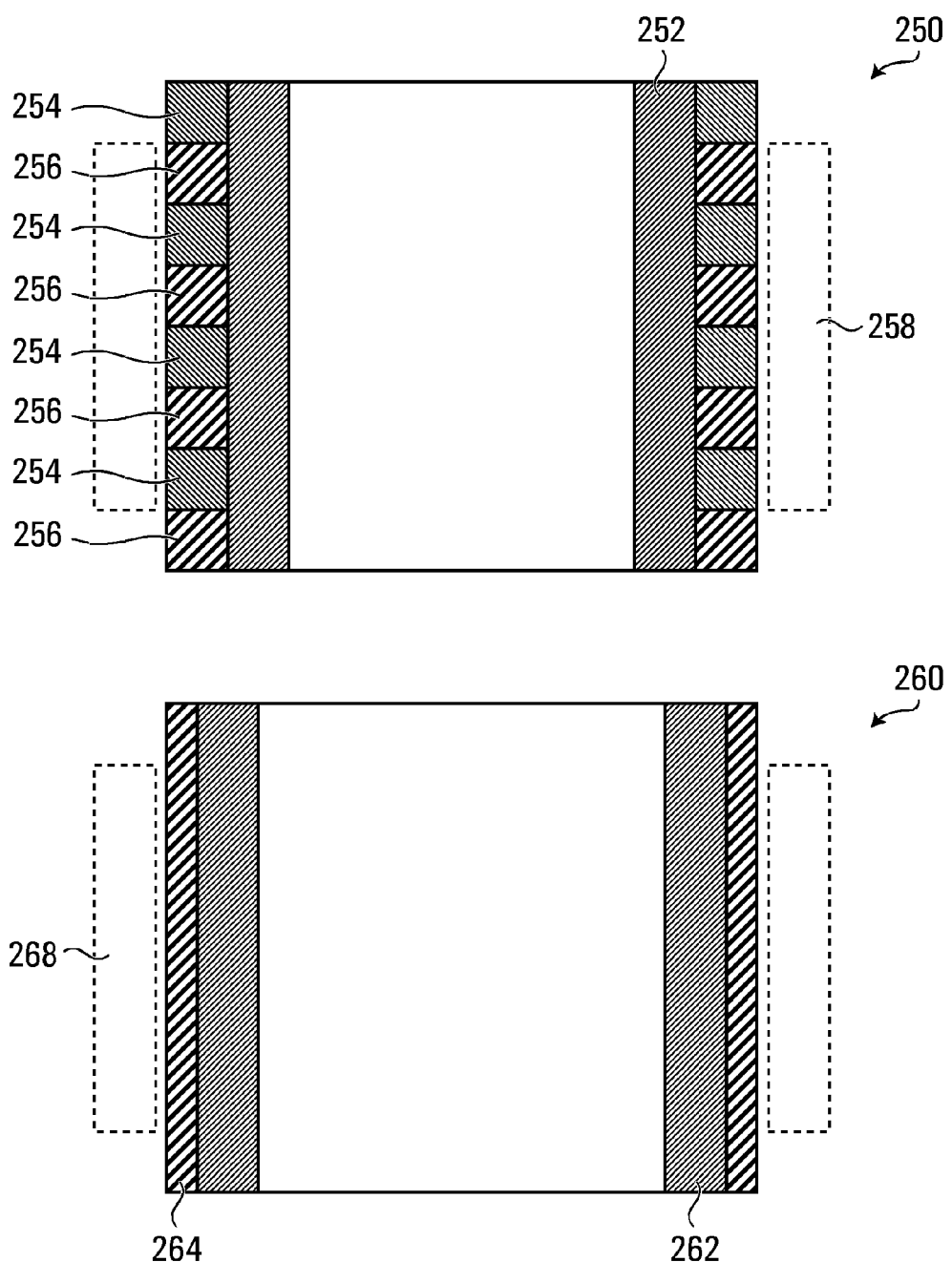
FIG. 2B is a cross sectional view of a ladder construction for an armature and a distributed armature.

The armature for the embodiment of FIG. 2A may be a distributed armature or have a ladder construction. In this case the piston seal operates against the steel cylinder and the required smoothness of the armature is determined by the bearing assemblies on the stator instead of the properties of the seal. A comparison between an example of a distributed armature 260 and an example of a ladder armature 250 is shown in FIG. 2B. The ladder armature 250 provides higher generator efficiency for the same stator mass. For the ladder armature 250, shown is a stator section 258, and alternately placed steel and aluminum rings 254,256 concentric with a steel yoke 252. For the distributed armature 260, shown is a stator section 268, and a steel cylinder 262 inside an aluminum cylinder 264.

The embodiments of the invention shown in FIGS. 1 and 2A present a seawater environment to the seal and generator components. The embodiment in FIG. 2A offers an improved situation in this regard because the wall of the pneumatic cylinder is steel, which being less active than the aluminum in the armature will be somewhat protected. The embodiment in FIG. 1 can expect pitting and corrosion of the aluminum thin-walled cylinder of the armature (which serves as the pneumatic cylinder) even if zinc anodes are used. Placement opportunities for the anodes are limited given that the aluminum is a working surface for the spring.

For any of the embodiments described herein, the shape of the buoy, its size and the selection of the secondary components will affect the power and velocity for the generator. The equations of motion for the second order WEC describe a coupled mechanical system that has a frequency response exhibiting two peaks if the coupling impedance between the primary and secondary masses is not too high. It is desirable and possible to have the same response at the peaks and to have a relatively flat response between them. It is well known that the two-degree-of-freedom system is used for damped vibration absorber applications to reduce the vibration of machines subject to speed variations. The purpose of this device is to minimize the motion of the machine that is subject to an applied force. The absorber has a bandwidth that includes the frequency of this excitation (the speed range of the machine). The reduction of the motion of the main mass is accompanied by relatively large motions of the secondary components, which implies high losses in the damper assembly. This is the feature that is exploited in a tuned WEC. An example of the tuning procedure for the vibration absorber that can be used for the WEC design is described later.

Figure 3:
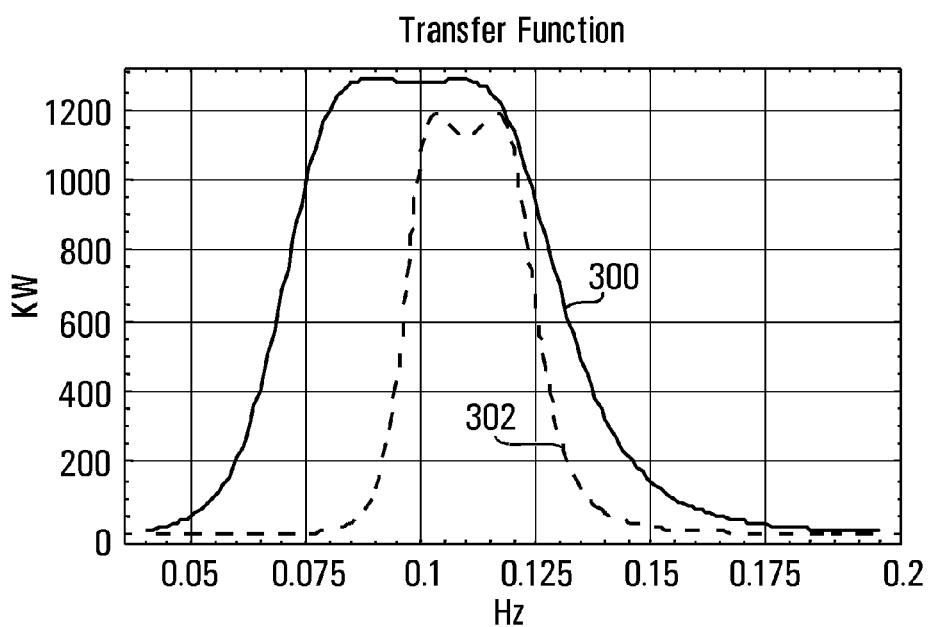
FIG. 3 shows the transfer function of two example wave energy converters.

It can be shown that the velocity effective at the PTO increases with decreasing size of the secondary components but at the expense of bandwidth and therefore output power. For the purpose of this example, it is assumed that the bandwidth of the ocean wave height spectrum of interest extends from about 0.075 Hz to 0.125 Hz. Referring to FIG. 3, shown is a transfer function 300 for a high power machine referred to hereinafter as WEC-I that exploits this entire bandwidth by using relatively large secondary components and offering relatively low secondary velocities. FIG. 3 depicts the power response of the WEC (kW) as a function of frequency (Hz) to excitation by gravity waves having a mean square height of 1 $m^2$.

Also shown is a transfer function 302 of a smaller machine referred to hereinafter as WEC-II that provides a more suitable velocity regime for the induction generator. Simulations indicate that WEC-II provides about 50% of the power of WEC-I at representative sites off the East Coast of Canada. This is not surprising considering the difference in bandwidths.

Figure 4:
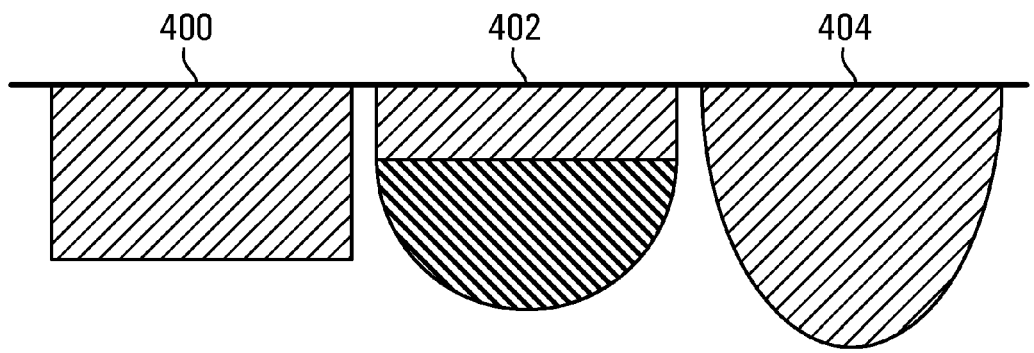
FIG. 4 shows cross sectional view of three buoy shapes.

In some embodiments, the viscous losses for the buoy are considered, and factored into the choice of the design of the buoy. In the illustrated example of FIG. 1, the buoy 100 consists of a hemispherical end-piece 122 fixed to a cylinder 121. The buoy shape was chosen to take advantage of its streamlined projected area compared to that of a right circular cylinder with vertical axis and the same buoy displacement. This choice reduces viscous friction losses without significantly affecting the coupling to gravity waves. The drag coefficient can be reduced further using a prolate spheroid with the same buoy displacement. Three example buoy shapes are shown in FIG. 4. Buoy 400 has a cylindrical shape and has the highest drag coefficient of the three examples; buoy 402 has a hemispherical end-piece, while buoy 404 has a prolate spheroid end-piece that has the lowest drag coefficient. Viscous losses decrease with decreasing drag coefficient. For the specific examples of FIG. 4, viscous losses for buoy 400 are the largest, and are the smallest for buoy 404, with the losses for buoy 402 falling between.

In some embodiments, the viscous losses for the spar are also considered, and factored into the choice of the design of the spar. The viscous losses of the spar can be reduced by using a constant diameter spar with a streamlined tip, for example a tip having a prolate spheroid shape. The spar may benefit from additional streamlining compared to the buoy because its velocities are significantly higher than those of the buoy.

Asymmetric Spring

Several configurations of the gas spring can be incorporated into the generator design with varying performance features. The pneumatic spring shown in FIG. 1 is asymmetric in the sense that motion of the piston is hard limited in the upward direction, but unlimited in the downward direction. Such a spring can be configured to provide a specified spring constant about a quiescent operating point.

More specifically, the top of the piston is limited in its upward motion by the cap 118 providing a hard spring characteristics that effectively becomes a hard upper limit on travel. Ideally, for such a spring, the spring design provides a specified spring constant at the quiescent position and also provides quasi-linear operation up to some specified displacement after which the hard spring characteristic engages over a sufficiently large distance. A displacement limit is not required in the opposite direction provided the design incorporates an armature length that is sufficient to cope with peak displacement events.

In some embodiments attention is directed at reducing the Coulomb friction loss caused by the travel of the seal along the armature. Lower losses can be achieved through the proper choice of seal material and a smooth pneumatic cylinder.

The valve 106 shown in FIG. 1 is included to automatically adjust the pressure in the cavity to cope with leakage and temperature changes. The design of the spring might, for example, follow these steps:
  a) A design displacement is set to define the range of quasi-linear operation at the specified spring constant.
  b) The quiescent force is chosen to set the physical length of the spring relative to the quiescent location. In a specific example, this can be set to be approximately twice the design displacement. This multiple is chosen to provide quasi-linear operation up to the design displacement and to allow an adequate distance for the hard spring characteristic to take effect without excessive shock during extreme events.
  c) The area of the spar is chosen and the quiescent pressure is calculated.

Figure 5:
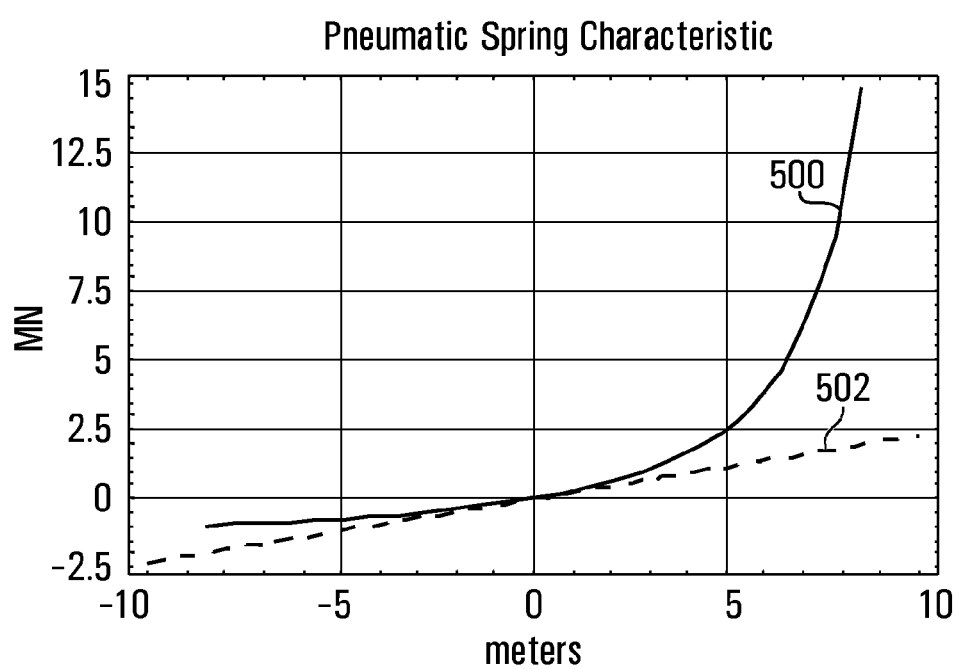
FIG. 5 is a plot of an example of an asymmetric pneumatic spring characteristic.

The spring characteristics for the previously discussed WEC-II are shown in FIG. 5 at 500. The linear spring characteristics are shown in dotted line 502 which when compared to that of the pneumatic spring reveals a relatively weak non-linearity out to about ±5 m for this particular example.

Atmospheric Pressure as Quiescent Condition

In some embodiments, atmospheric pressure is specified for the quiescent condition. This choice avoids the need for a separate gas supply and its accompanying controls. In some embodiments in which atmospheric pressure is specified for the quiescent condition, a control system is provided that uses a pressure sensor and measurements of the position of the secondary mass to adjust the cavity pressure. Adjustments may be made to compensate for changes in cavity pressure due to temperature changes of the gas and leakage around the piston. The output of the pressure sensor when the spar is at the quiescent location is used to adjust the quiescent pressure. When the pressure is low, a specified mass of air is added to the cavity by opening the valve at the upper end of the cavity when the spar is below the quiescent location. Conversely, the mass of air in the cavity is decreased by opening the valve when the spar is above the quiescent location.

Higher than Atmospheric Pressure for Quiescent Condition

Figure 6:
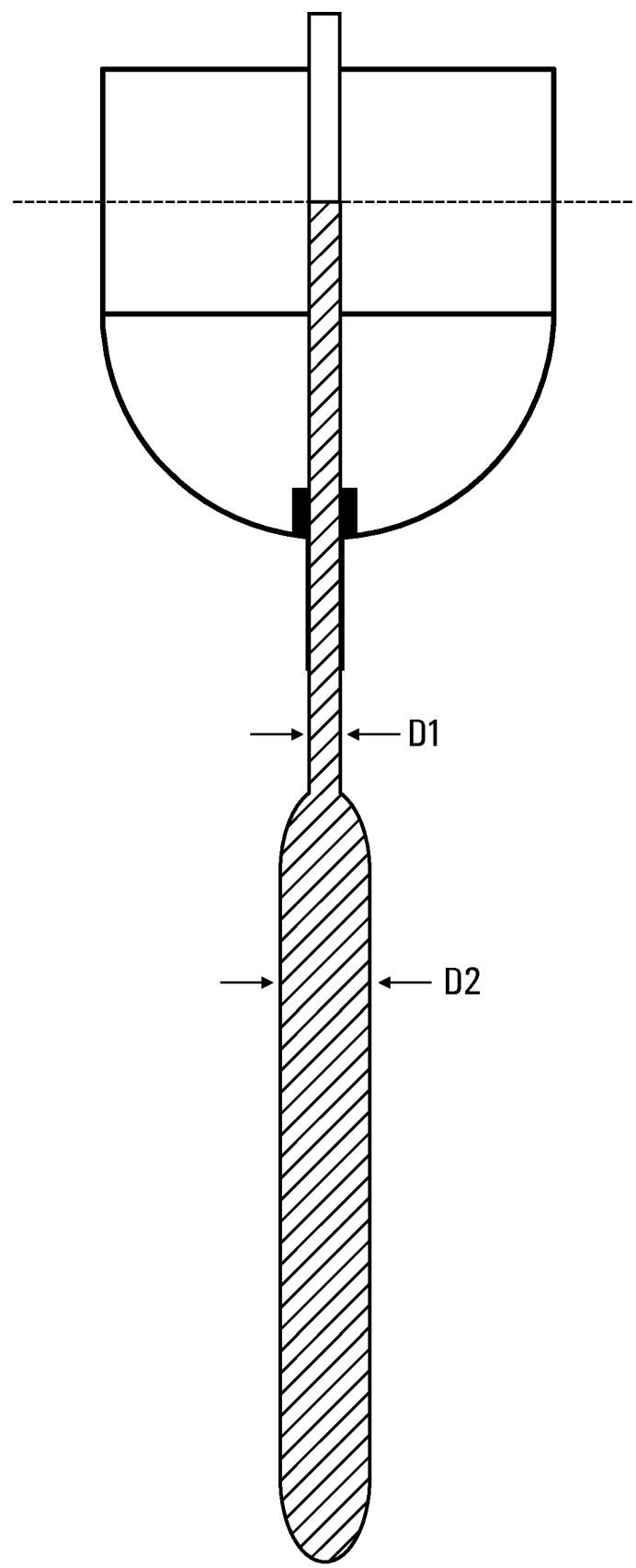
FIG. 6 is a cross sectional view of a wave energy converter featuring a spar with differing diameters.

In some embodiments, a higher quiescent pressure is employed. A higher quiescent pressure allows for a reduced diameter for the spar. As such, it may be advantageous to use a higher quiescent pressure if the resulting diameter of the spar required for a quiescent pressure at atmospheric pressure is too large. A smaller diameter for the spar may allow for the realization of a less expensive generator and may reduce material costs. However, the advantages of a smaller diameter spar at the water line may require a spar of impractical length in order to provide sufficient secondary mass. Note that the secondary mass is mainly determined by the mass of the water displaced by the spar. In some embodiments, the diameter of the spar at the waterline is reduced compared to the diameter of the spar at depth. An example of this is depicted in FIG. 6, where the spar has a first diameter D1 over a portion of its length, and this changes in a streamlined manner to a second larger diameter D2 over a portion of its length.

The Symmetric Spring

The embodiments of FIG. 1 and FIG. 2 feature an asymmetric spring that permit the salt-water environment to impact the stator and the piston materials. Specifically, the spar 114 interacts directly with the water. A second configuration of the gas spring that takes the piston (and the generator) out of the seawater will now be described with reference to FIG. 7 which provides a side cutaway view. This configuration also provides improved accessibility to the secondary components. A buoy structure is generally indicated at 700. A generally cylindrical guide 732 having a top 734 is mounted within the buoy structure for guiding a spar 714. The spar is supported by bearings 710 and a roller guide 715 and is extended to the required depth in the direction of the arrows shown in FIG. 7. A pneumatic cylinder 702 (702A, 702B) having top 703 and bottom 733 is connected to the top 734 of the guide 732; the pneumatic cylinder also functions as an armature, and includes a steel outer cylinder 702A inside which an aluminum cylinder 702B is flush mounted. Inside the aluminum cylinder of the pneumatic cylinder 702, there is a piston 716 connected to the spar 714 by a piston rod 730 that passes through a seal in an opening in the bottom of the pneumatic cylinder 702. The piston rod 730 and the companion seal/opening in the top of the guide may have a cross section that locks the rotation of the spar to that of the buoy, for example elliptical. A stator 712 is formed on the piston 716. A first valve 707 is provided in the top 703 of the pneumatic cylinder 702, and a second valve 706 is provided at the bottom of the pneumatic cylinder 702. The space 740 between the top of the piston 716 and the top 703 of the pneumatic cylinder functions as a first chamber of a symmetric pneumatic spring. The space 742 between the bottom of the piston 716 and the bottom 733 of the pneumatic cylinder 702 functions as a second chamber of the symmetric pneumatic spring. When placed in water, the wave energy converter floats, with the designed sea level indicated at 720. While the top 734 of the guide 732 and the bottom 733 of the pneumatic cylinder 702 are described as separate components, they could alternatively be formed of a common component.

In this embodiment, the spar 714 serves as the secondary mass but does not function as the piston for the pneumatic spring; instead a separate piston 716 is provided for the pneumatic spring; the separate piston 716 provides the platform for the generator stator 712. The armature consists of a steel thin-walled cylinder 702A inside which the aluminum thin-walled cylinder 702B is flush-fitted. The aluminum cylinder has a smooth inner surface that serves as the cylinder for the symmetric pneumatic spring. The previously discussed ladder construction could be used to achieve greater generator efficiency if tolerances are set to achieve the required smoothness.

The resulting symmetric pneumatic spring also includes functional efficiency. The stator 712 is included in the piston 716, the pneumatic cylinder 702 serves as the armature and a displacement limiting function is built in. Specifically, the top 703 of the pneumatic cylinder limits the upward mobility of the piston, and the bottom 733 of the pneumatic cylinder limits the downward mobility of the piston. Atmospheric or a higher pressure (depending on the diameter that is chosen for the spring) determines the quiescent operating point. The automatic tuning of each chamber 740,742 via valves 707, 706 may follow the procedure described for the asymmetric spring. In some embodiments, pressure is supplied via a tank instead of from the atmosphere.

The guide 732 for the spar 714 serves to guide the spar 714. The roller guide 715 placed a suitable distance below the buoy 700 lines up the spar to properly engage the bearings 710. Seals and the attention to tolerances for fitting the spar 714 in the buoy 700 to satisfy the generator requirements can be eased. The main action takes place above the spar and its guide. The motion of the spar 714 is coupled to the piston 716 in the pneumatic spring through a seal contained in the bottom 733 of the pneumatic cylinder. The lengths of chambers 740, 742 may, for example, be equal to the length calculated for the asymmetric spring but the diameter can be reduced (assuming the same quiescent pressure) because the springs in the upper and lower chambers are acting in parallel.

Piston seals are located above and below the piston 716 to achieve symmetry for both chambers 740,742. The lower chamber 742 may be slightly longer than the upper chamber 740 to compensate for the volume of the piston rod 730. Preferably, the piston rod 730 is designed to have a specified column strength and low thermal resistance. It is the main conductor of heat out of the stator and into the heat sink (the spar).

Figure 7:
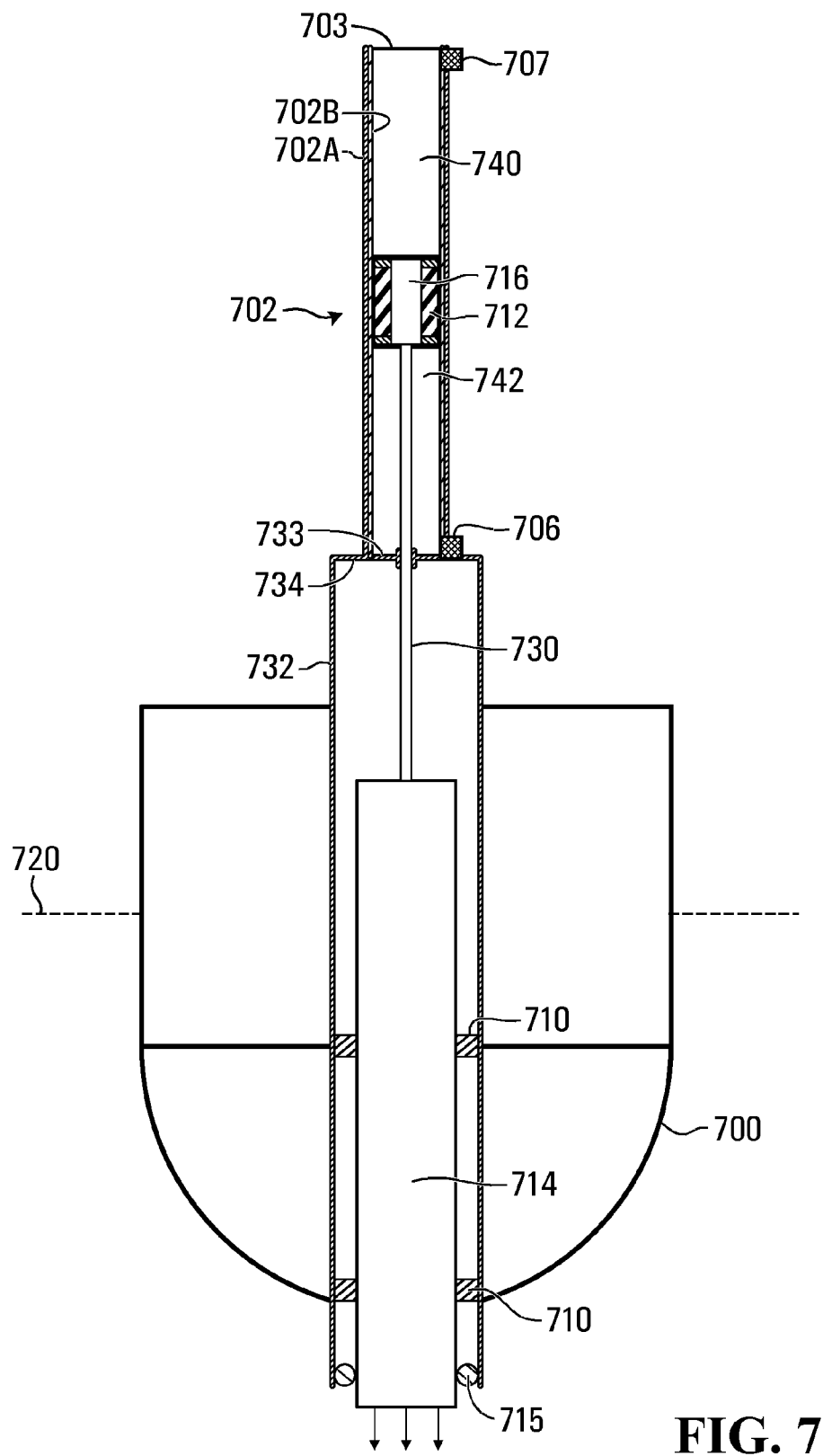
FIG. 7 is a cross sectional view of another wave energy converter provided by an embodiment of the invention featuring a symmetric pneumatic spring.
Figure 8:
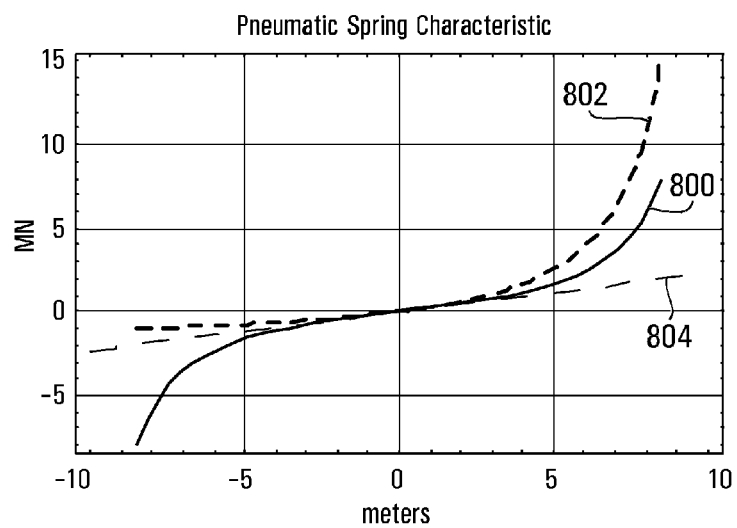
FIG. 8 is a plot of an example of a symmetric pneumatic spring characteristic.

The spring characteristics for a simulated example implementation of the embodiment of FIG. 7 are depicted in FIG. 8 at 800 along with those for the linear spring at 804 and the asymmetric spring 802.

Figure 9:
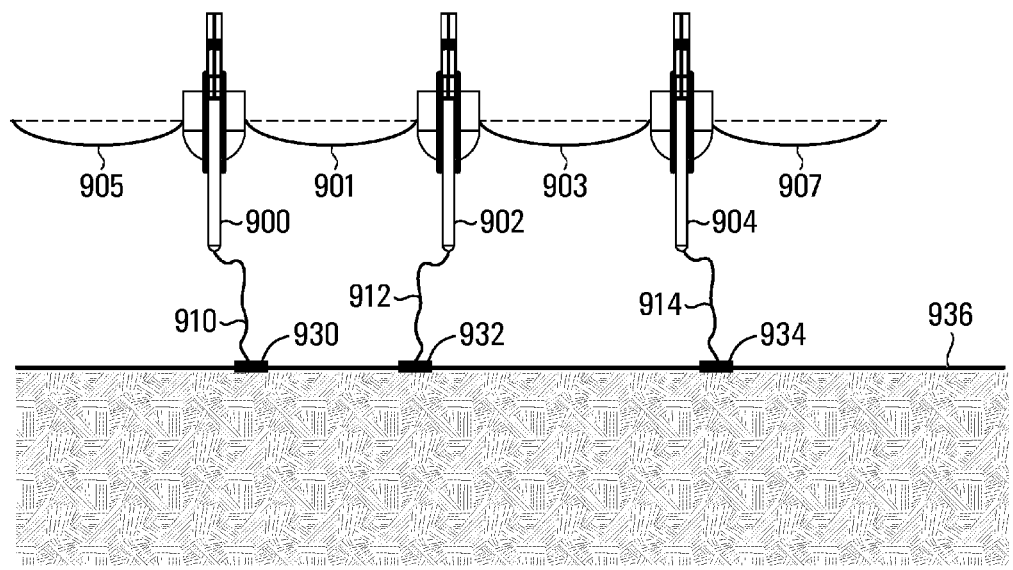
FIG. 9 depicts an example mooring plan.

An example of a mooring plan for a line of WEC's with stators mounted in the spars is shown in FIG. 9. A series of WECs 900,902,904 are depicted. Three are shown for the sake of example only. The WECs 900,902,904 are interconnected through tether cables 901,903. Also shown are tether cables 905,907, either to other WECs, not shown, or to a moored end buoy that may or may not be submerged. The power is taken out from the bottom of the spar of each WEC 900,902,904 and connected via a respective slack wire tether 910,912,914 which may include placement of small floats at intervals along negatively buoyant electrical cable to a respective junction box 930,932,934 on a bottom-mounted transmission cable 936. The view of each WEC in FIG. 9 shows that the spar is acting like a sea anchor and together with proper distribution of the ballast in the buoy should considerably reduce the roll of the buoy. In some embodiments, the WEC designs in FIGS. 1 and 7 employ this approach.

In some embodiments, the WEC design in FIG. 2 with stator mounted on the buoy incorporates electrical conductors in an armoured tether cable, thereby dispensing with the need for the bottom transmission line and separate electrical cables such as cables 910,912,914 depicted in FIG. 9.

The Double-Sided Induction Generator

Figure 10:
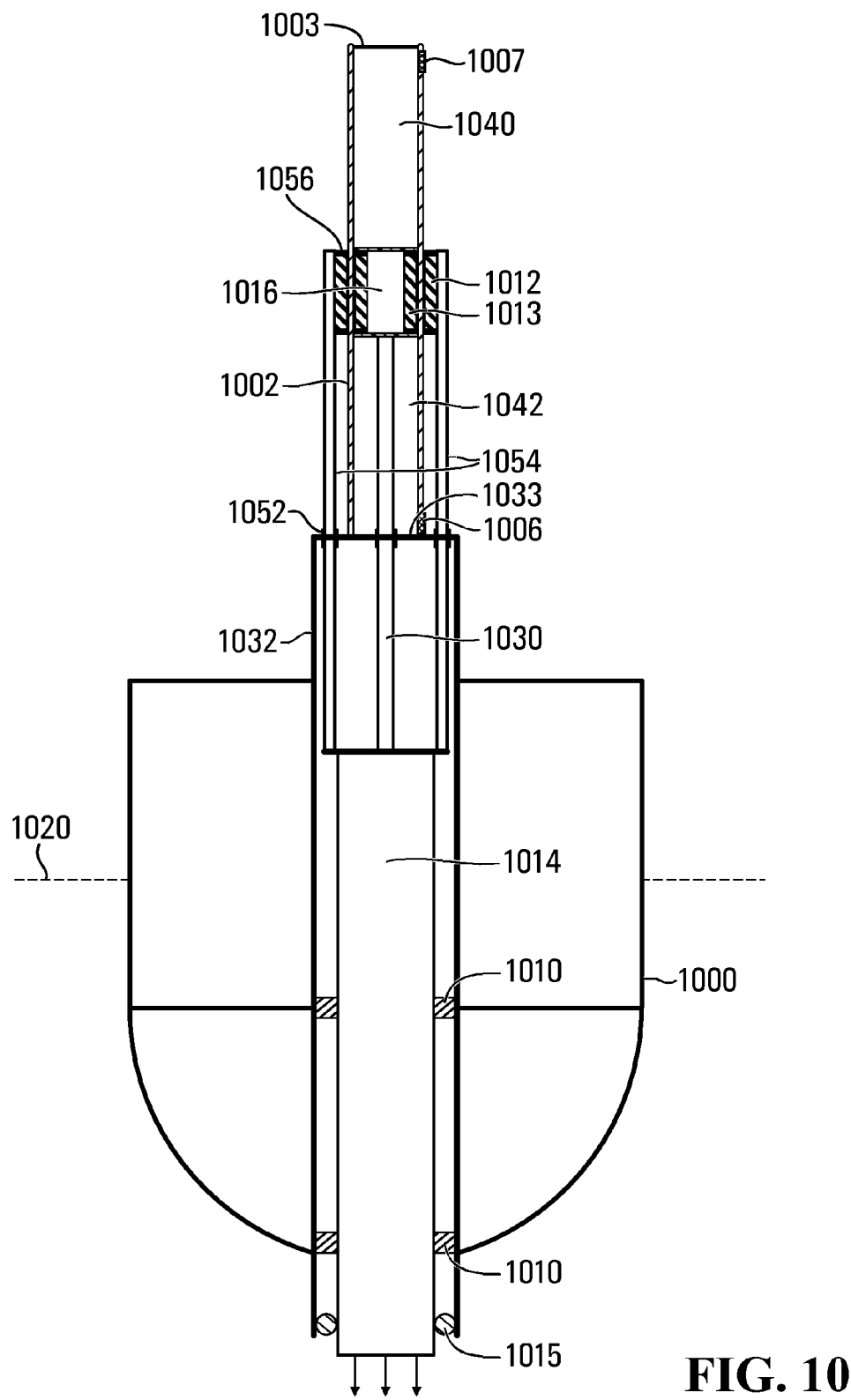
FIG. 10 is a cross sectional view of another wave energy converter provided by an embodiment of the invention featuring a symmetric pneumatic spring and a two-sided armature.

In some embodiments, a double-sided tubular construction for the induction generator is employed. This can have the effect of reducing the mass of the generator and obtaining improved performance. For example, in some implementations leakage inductance almost vanishes and magnetic attraction forces between the iron-free armature and the stators vanish. Bearing stresses are not eliminated because departures from the perfect geometry in the tubular generator configuration are present due to manufacturing tolerances. This saving in mass arises because the armature uses only an aluminum thin-walled cylinder instead of the concentric aluminum/steel cylinders that are used by the single-sided configurations shown in FIGS. 1, 2, and 7. An example of a WEC featuring this type of construction will now be described with reference to FIG. 10.

A buoy structure is generally indicated at 1000. A generally cylindrical guide 1032 is mounted within the buoy structure for guiding a spar 1014. The spar is supported by bearings 1010 and a roller guide 1015 and is extended to the required depth in the direction of the arrows shown in FIG. 10. A pneumatic cylinder 1002 having top 1003 and bottom 1033 is connected to the top of the guide 1032; the pneumatic cylinder 1002 includes an aluminum cylinder. Inside the aluminum cylinder of the pneumatic cylinder 1002, there is a piston 1016 connected to the spar 1014 by connecting rod 1030 that passes through an opening in the bottom of the pneumatic cylinder and/or the top of the guide 1032. An inner stator 1013 is formed on the piston 1016. An outer stator 1012 is held by connecting rods 1054 that are connected to the spar 1014 that pass through openings in the top of the guide 1032. A first valve 1007 is provided in the top 1003 of the pneumatic cylinder 1002, and a second valve 1006 is provided at the bottom of the pneumatic cylinder 1002. The space between the top of the piston 1016 and the top 1003 of the pneumatic cylinder functions as one chamber 1040 of a symmetric pneumatic spring. The space 1042 between the bottom of the piston 1016 and the bottom of the pneumatic cylinder functions as the other chamber of a symmetric pneumatic spring. When placed in water, the wave energy converter floats, with the designed sea level indicated at 1020.

In this embodiment, the spar 1014 serves as the secondary mass but does not function as the piston for the pneumatic spring; instead a separate piston 1016 is provided for the pneumatic spring; the separate piston 1016 provides the platform for the inner stator 1013.

The inner stator 1013 is connected to the spar 1014 by connecting rod 1030 and the outer stator 1012 is connected to the spar using, for example, three or four rods 1054 between the outer stator and the top of the spar 1014. The rods 1054 may be equispaced in angular space to avoid troublesome moments. The connecting rods 1054 from the spar 1014 to the outer stator 1012 may pass through bearings/guides 1052 in the top of the guide 1032 that guide the motion of the spar 1014 inside the buoy 1010. These bearings lock the angular position of the spar to that of the buoy and this eliminates the requirement for high power slip rings for the electrical tether and reduces wear on the seals of the pneumatic spring. With a single stator such as described in previous embodiments, the stator has a yoke of steel that turns the flux from one pole and returns it to the other (of opposite polarity along a pole length of the yoke). The steel in the armature sandwich is the yoke. In the double-sided construction the flux passes straight through the aluminum conductor from one stator to its mirror image pole on the other stator that has opposite polarity. The yoke is not needed.

Figure 11:
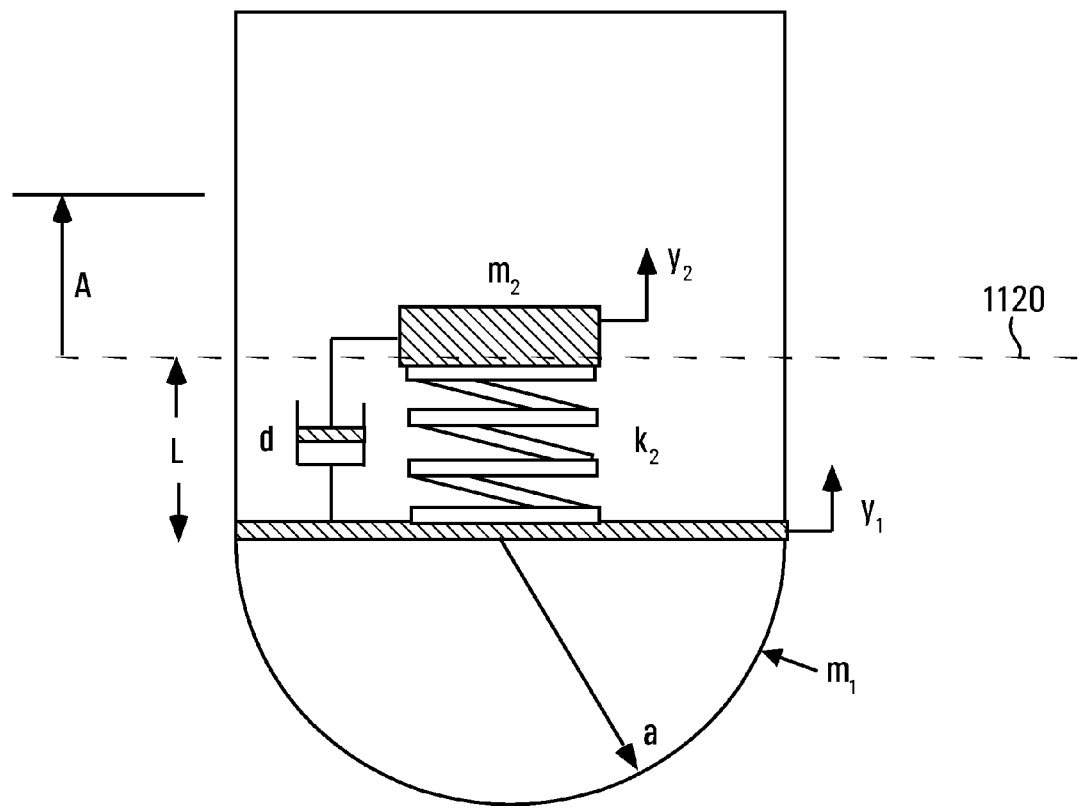
FIG. 11 depicts a model of a WEC.

Referring now to FIG. 11, a model of a WEC is depicted. Shown is a buoy having mass $m_1$ that is equal to the sum of the buoy displacement and the hydrodynamic mass. Displacement of the buoy is represented as $y_1$, and velocity is $v_1$ (not shown). A secondary mass $m_2$ is connected to the primary mass through a spring having spring constant $k_2$. Motion of the secondary mass is represented as $y_2$, and velocity is $v_2$ (not shown). Damper d represents damping in the secondary system; this is damping caused by the generator. For this example, the buoy has a cylindrical top portion the submerged portion of which has a height, L, with a hemispherical bottom portion having radius a.

Other parameters that do not directly relate to the physical hardware are present. A gravity wave of amplitude, A, produces forces that move the buoy in heave. The motion of the buoy yields additional mass for the primary system (hydrodynamic mass) and it introduces a damping coefficient, b (not shown), that corresponds to the wave making energy dissipated by the oscillating buoy. Buoyancy forces acting on the buoy yield an effective spring constant, $k_1$ (not shown), in the primary system. Non-linear viscous damping also acts on the heaving buoy.

Figure 12:
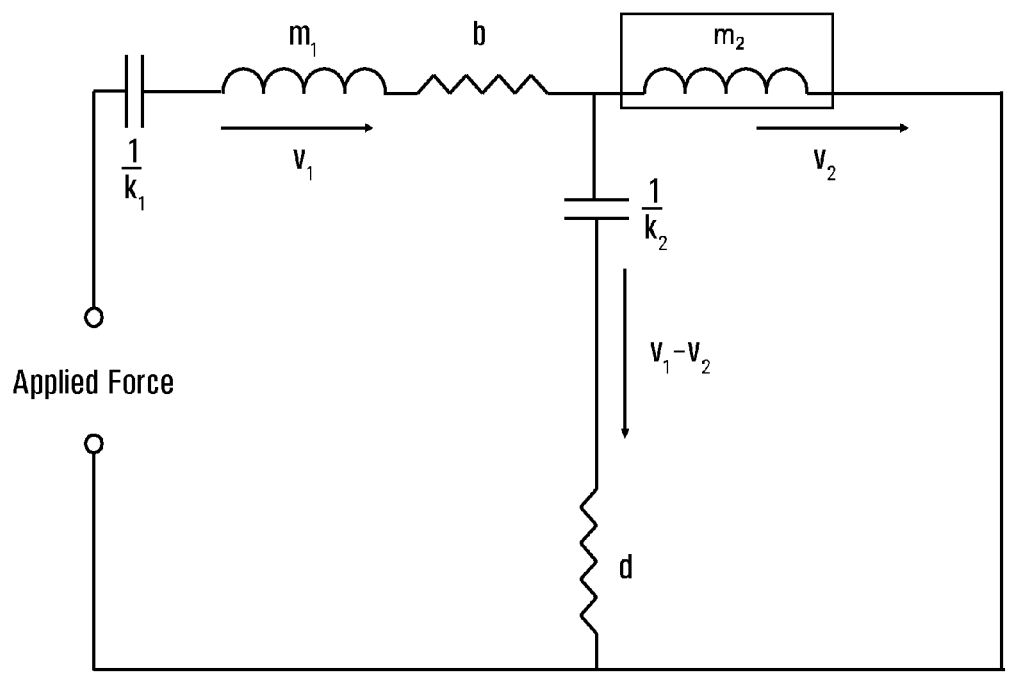
FIG. 12 depicts an equivalent circuit model of the WEC of FIG. 11.

An equivalent circuit model is depicted in FIG. 12. The velocities $v_1$ and $v_2$ of the masses $m_1$ and $m_2$ equate to currents in the equivalent circuit model. The secondary circuit (the second mesh in the circuit diagram) can be interpreted as an impedance that varies with frequency and is at its highest in the vicinity of parallel resonance. This condition reduces the primary velocity (as required by the vibration absorber) and generates high velocities through both reactive components of the secondary system. The reactive components of these velocities are nearly in anti-phase and for this reason are sometimes referred to as circulating currents in the electrical analog. The power dissipated in the resistor, d, at these high velocities corresponds to the output of the WEC. The design procedure for the damped vibration absorber is directly applicable to the determination of the parameters of the secondary system. Small adjustments to this procedure can be made to deal with the frequency dependence of several parameters and to provide for a relatively flat frequency response in the pass band. The latter adjustment follows from the fact that the flat bandwidth for the vibration absorber applies to the displacement of the primary mass and not to the WEC variable of interest, which is the relative velocity between the armature and the stator ($v_1$-$v_2$). The inclusion of viscous damping can be modeled through simulation techniques.

Figure 13:
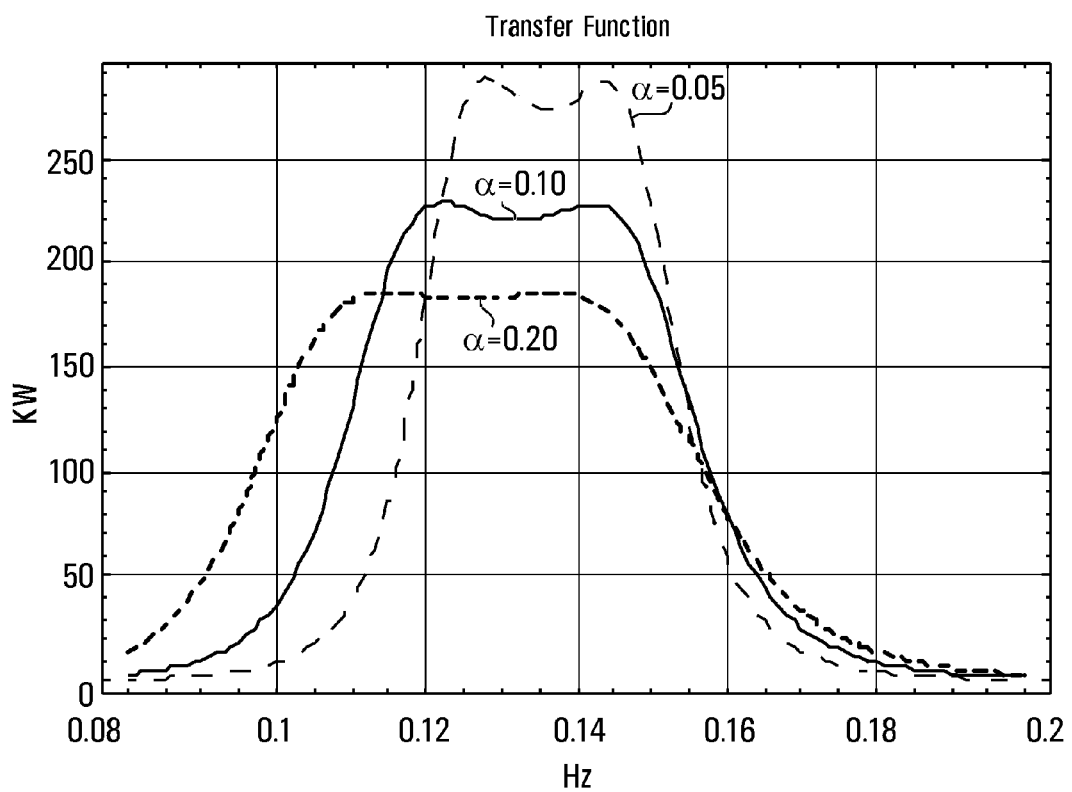
FIG. 13 contains plots of power versus frequency for WEC's having three different values of $\alpha$.

A parameter $\alpha$=ratio of secondary mass to primary mass=$m_2/m_1$ has a significant effect upon the transfer function of the WEC. The transfer function of a small WEC with bandwidth higher than desired for useful energy extraction was modeled to show the dependence of the transfer function and velocity response on $\alpha$. Referring to FIG. 13, shown is a transfer function plotted for three values of $\alpha$ (the ratio of secondary mass to primary mass), namely $\alpha$=0.05, $\alpha$=0.1, $\alpha$=0.2. In FIG. 13, the vertical axis is power absorbed by the WEC as a function of frequency given excitation by gravity waves having a mean square height of 1 m$^2$. It can be seen that a WEC with a smaller $\alpha$ has a higher response, but over a narrower bandwidth compared to a WEC with a larger $\alpha$. In other words, the bandwidth increases as the mass of the secondary is increased, but as the secondary mass decreases, a higher response is achieved over a smaller bandwidth.

Figure 14:
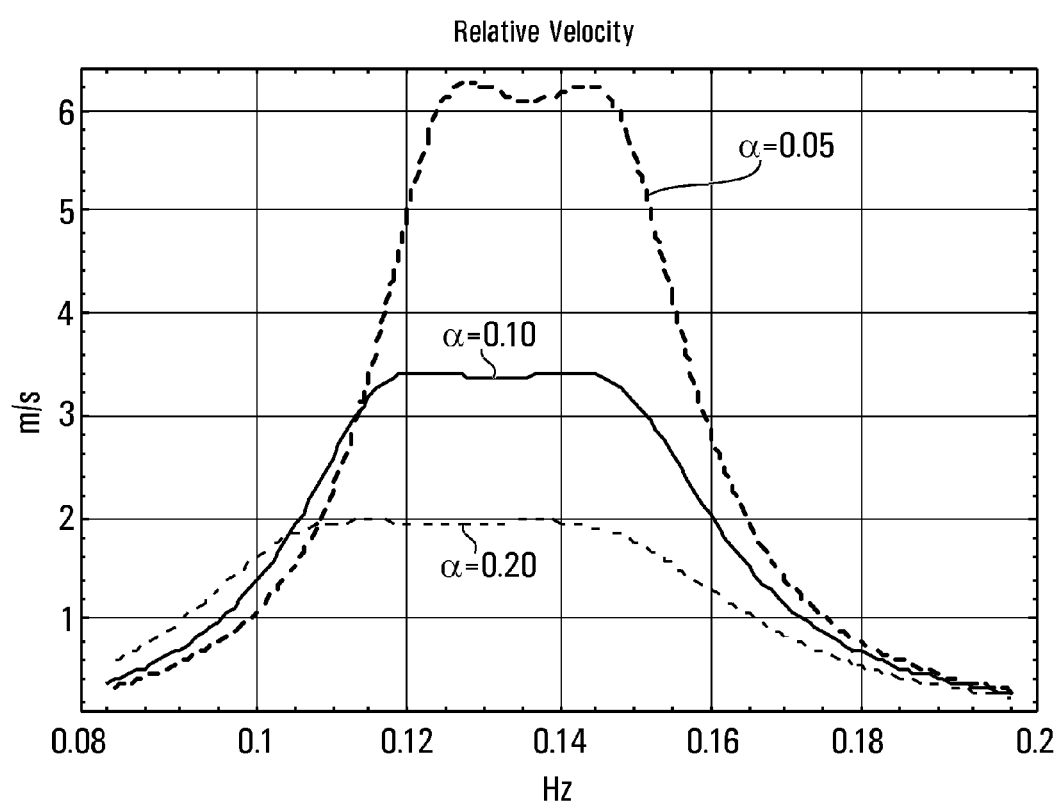
FIG. 14 contains plots of relative velocity versus frequency for WEC's having three different values of $\alpha$.

Referring now to FIG. 14, shown are plots of relative velocity as a function of frequency for the same three WEC's modeled and discussed with reference to FIG. 13. It can be seen that the velocity is higher for smaller alpha, and lower for higher alpha. A higher velocity is better for the generator. Recall, a smaller alpha can be realized by having a smaller secondary mass relative to the primary mass. However, from FIG. 13, it can be seen that a smaller alpha results in a transfer function with less bandwidth. As such, it can be seen that there is a tradeoff between velocity and bandwidth.

With appropriate selection of the parameters in the model, the bandwidth can be matched to a spectrum of interest. Ideally, the resulting bandwidth would offer a high enough velocity regime to use a direct drive generator. If not, the velocity level can be increased at the expense of bandwidth. The reduced bandwidth can be placed in the upper part of the spectrum to obtain a smaller overall unit. This is the scenario that is described by FIG. 3. A high power output that corresponds to the response curve 300 is obtained at the expense of low relative velocities between the spar and the buoy. The response curve of a smaller unit and smaller $\alpha$ 302 settles for lower power to obtain velocities high enough for a practical induction generator.

Numerous modifications and variations of the present disclosure are possible in light of the above teachings. It is therefore to be understood that within the scope of the appended claims, the disclosure may be practiced otherwise than as specifically described herein.

I claim:

1. A wave energy converter with two degrees of freedom comprising:
   a buoy having an interior guide, motion of the buoy representing a first degree of freedom;
   a spar mounted within the interior guide so as to be movable therein, motion of the spar representing a second degree of freedom;
   a pneumatic spring between the spar and the buoy to provide restoring forces when the spar departs from a quiescent position relative to the buoy; and
   a damping element in the form of an induction generator having an armature and a stator, with one of the stator and armature fixed to the spar and the other of the stator and armature fixed to the buoy to generate power when the spar moves relative to the buoy in the presence of excitation by ocean gravity waves;
   wherein the mass of the wave energy converter and dimensions of the buoy are such that in use, the buoy floats in a partially submerged position.

2. The wave energy converter of claim 1, wherein the pneumatic spring is an asymmetric pneumatic spring having a hard spring characteristic in one direction and a soft spring characteristic in the other direction.

3. The wave energy converter of claim 2, wherein:
   the spar provides a secondary mass and also functions as a piston of the pneumatic spring;
   the induction generator comprises:
      the stator mounted to the top of the spar;
      the interior guide of the buoy functioning as the armature.

4. The wave energy converter of claim 1, further comprising at least one valve for adjusting a pressure within the pneumatic spring.

5. The wave energy converter of claim 1, wherein the interior guide of the buoy comprises the armature, the armature comprising a cylinder of aluminum mounted within a cylinder of steel.

6. The wave energy converter of claim 1, further comprising:
   bearing assemblies to maintain a specified separation between the stator and the armature in the presence of a magnetic attraction force between the armature and the stator.

7. The wave energy converter of claim 2, wherein:
   the spar provides a secondary mass and also functions as the armature;
   the induction generator further comprises the stator mounted at a bottom of the buoy.

8. The wave energy converter of claim 1, wherein the spar has a streamlined projected area.

9. The wave energy converter of claim 8, wherein the streamlined projected area has a hemispherical or prolate spheroid shape.

10. The wave energy converter of claim 1, wherein the spar has a diameter that is small at the water line and is made larger at depth by incorporating a streamlined change in the spar diameter.

11. The wave energy converter of claim 1, wherein the pneumatic spring is a symmetric pneumatic spring.

12. The wave energy converter of claim 11, wherein the pneumatic spring comprises a pneumatic cylinder above the interior guide of the buoy, the pneumatic cylinder functioning as the distributed armature of the induction generator;

the wave energy converter further comprising a piston within the pneumatic cylinder connected to the spar with at least one connecting rod;

the stator is integrated into the piston assembly;

wherein a first chamber of the symmetric pneumatic spring is defined between a bottom of the piston and a bottom of the pneumatic cylinder, and a second chamber of the symmetric pneumatic spring is defined between a top of the piston and a top of the pneumatic cylinder.

13. The wave energy converter of claim 12, further comprising at least one valve for adjusting a pressure within the first chamber, and at least one valve for adjusting a pressure within the second chamber.

14. The wave energy converter of claim 12, further comprising:

bearing assemblies that support the spar within the interior guide.

15. The wave energy converter of claim 12, wherein the at least one connecting rod comprises an elliptical connecting rod.

16. The wave energy converter of claim 1, wherein the induction generator comprises a two-sided stator.

17. The wave energy converter of claim 16, wherein:

the pneumatic spring comprises a pneumatic cylinder above the interior guide for the spar, the pneumatic cylinder functioning as the armature of the induction generator;

the wave energy converter further comprising a piston within the pneumatic cylinder connected to the spar with at least one connecting rod;

the induction generator comprises a first stator inside the pneumatic cylinder supported by the piston, and a second stator outside the pneumatic cylinder that is connected to the spar with at least three equispaced connecting rods;

wherein a first chamber of the pneumatic spring is defined between a bottom of the piston and a bottom of the pneumatic cylinder, and a second chamber of the pneumatic spring is defined between a top of the piston and a top of the pneumatic cylinder.

18. The wave energy converter of claim 17, further comprising guides for the connecting rods in a top plate of the interior guide so as to constrain the relative rotational motion between the spar and the buoy.

19. The wave energy converter of claim 1, wherein the armature comprises a ladder arrangement having alternate placement of aluminum and steel rings inside or outside a steel component.

20. The wave energy converter of claim 1, wherein the induction generator is tubular.

21. The wave energy converter of claim 1, further comprising:

a vector controller that controls force and flux density independently.

22. The wave energy converter of claim 1, wherein the armature is a distributed armature.

23. The wave energy converter of claim 1, wherein the armature has a ladder construction.

24. The wave energy converter of claim 1, wherein the wave energy converter is configured to provide a bandwidth that matches or is included in a bandwidth of an average wave height spectrum for a site of interest.

* * * * *